May 29, 1951　　T. F. E. FUCHSLOCHER　　2,555,190
REINFORCED CHAIN TRANSMISSION BELT
Filed April 11, 1949
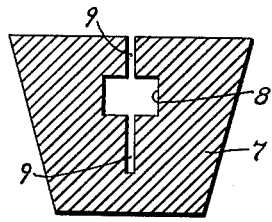
Fig.1
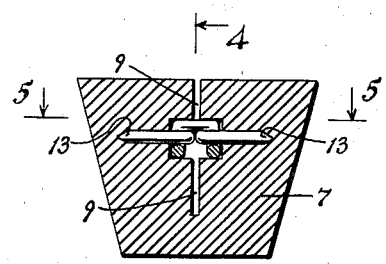
Fig.3
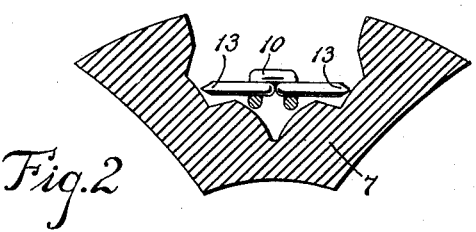
Fig.2
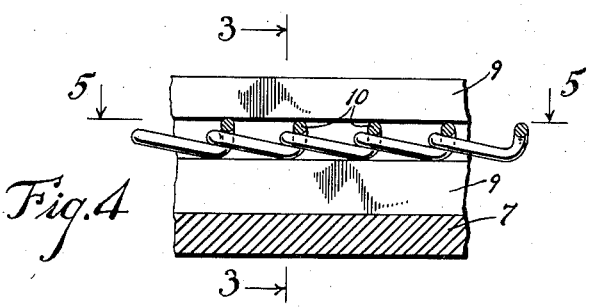
Fig.4
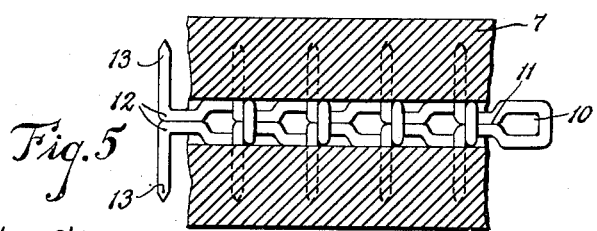
Fig.5
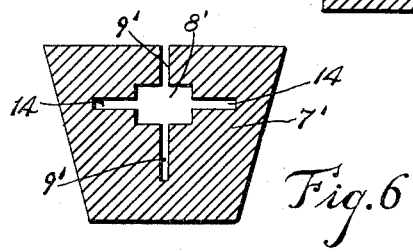
Fig.6
INVENTOR.
THEODOR F.E. FUCHSLOCHER
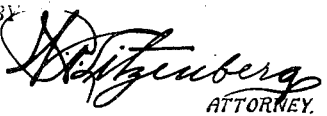
ATTORNEY.

Patented May 29, 1951

2,555,190

UNITED STATES PATENT OFFICE 2,555,190

REINFORCED CHAIN TRANSMISSION BELT

Theodor F. E. Fuchslocher, Van Nuys, Calif.

Application April 11, 1949, Serial No. 86,758

4 Claims. (Cl. 74—237)

This invention relates to reinforced chain transmission belts, and more particularly to a power transmission belt in which reinforcing metal links are embedded therein to give additional strength thereto without interfering with the required flexibility.

Among the salient objects of the invention are: to provide a reinforced belt construction in which chain links are wholly embedded within the belt body and in which lateral prongs, forming a part of said chain, are inserted laterally into the opposite sides of said belt body from the inside; to provide in such a reinforced chain transmission belt, a chain structure having laterally extending prongs for interlocking with other links, but projecting laterally in a position whereby when embedded in the body of a belt constructed to receive them, said prongs will be caused to pierce the body of the belt and will be thus interlocked with the body of the belt and interlocked with the next contiguous link of the chain.

Other objects and advantages of the invention will be presented in the following more detailed description of the invention, taken with the accompanying sheet of drawings, in which:

Figure 1 is a cross sectional view through a transmission belt;

Figure 2 is a similar view in which the body of the belt has its opposite sides sprung outwardly to open up the central chamber therein to receive the links of the reinforcing chain;

Figure 3 shows the belt, with the sides closed together in normal position, with the chain in place therein with the prongs thereof pierced into the opposite sides of said belt body;

Figure 4 is a longitudinal sectional view taken on line 4—4 of Fig. 3, showing how the links of the chain are embedded in the body of the belt;

Figure 5 is a horizontal sectional view taken on line 5—5 of Fig. 3; and

Figure 6 is a cross sectional view of a belt body having the longitudinally extending chamber therein, with the vertical, coextensive slit intersecting said chamber, but also having the lateral recesses to receive the chain prongs without the necessity of piercing the opposite sides of said body.

Referring now in detail to the drawings, the belt body is shown in cross section in Figs. 1, 2 and 3, and in longitudinal sectional views in Figs. 4 and 5. The belt body may be made of any suitable material, composition or of rubber, as best suited for the service required.

The belt body is designated 7, and is shown formed with a longitudinally extending chamber 8 therein, here shown of square form, with a vertical cut or slit 9, coextensive with said chamber, and intersecting said chamber, as illustrated in Figs. 1 and 3. This makes it possible to spread the opposite sides of said body apart, as illustrated in Fig. 2, to receive a reinforcing chain, or other suitable reinforcing member.

The chain, as here shown for illustrative and descriptive purposes, consists of a wire loop, as 10, shown square in form, with the two ends brought together, as at 11, for a short distance, and then bent to right angles outwardly, as at 12, in alinement with each other as shown, said ends forming prongs 13, 13, with sharp ends as shown. In Figs. 4 and 5, said links are shown interlocked together to form a chain, with the prong portions thereof inserted into the opposite sides of the belt body, as seen in Fig. 5.

In assembling the chain in the belt body, the belt body is spread open, as illustrated in Fig. 2, the chain links are laid therein, as indicated in said Fig. 2, and then when the sides of said body are forced together, as in Fig. 3, the prongs are caused to pierce into the opposite sides of said body in the interlocked positions shown.

Instead of having the link prongs sharp and forced into the body of the belt by force, said belt body 7' can be formed as shown in Fig. 6, with the chamber 8', with the vertical slits 9', 9', and the laterally extending bores or recesses 14, to receive said prongs in the manner shown without piercing the rubber, as represented in Fig. 3.

The belt body can be of V-type, or any other form in cross section, as may be desired for the kind of service to be performed.

I do not limit the invention to the details of the showing made to explain it, except as I may be limited by the hereto appended claims.

I claim:

1. A reinforced chain transmission belt consisting of a belt body having a longitudinally extending chamber formed wholly therein, with a slit from the side of said body to and through said chamber and coextensive therewith, and a chain of links interlocked together and laid within said chamber, said links having laterally extending prong portions, in transverse alinement with each other to penetrate the opposite sides of said belt body.

2. A reinforced chain transmission belt consisting of a belt body having a longitudinally extending chamber formed wholly therein, with a vertical slit in said body, intersecting said chamber and extended out through one side of said body, and coextensive therewith, whereby the opposite sides of said body can be sprung apart, and a chain having laterally extending prongs, in transverse alinement with each other, adapted to pierce the opposite sides of said body as said sides are forced together, as illustrated.

3. A reinforced chain transmission belt consisting of a belt body having a longitudinally extending chamber formed therein, wholly within the body thereof, with a coextensive slit intersecting said chamber, whereby the opposite sides of said body can be sprung apart to receive a reinforcing chain, and a chain having its links interlocked together and having laterally extending prongs in transverse alinement with each other to penetrate the opposite sides of said body as the opposite sides of said belt body are brought together in normal condition.

4. A transmission chain belt in which the body is provided with a longitudinally extending chamber therein, with an intersecting slit through said chamber and coextensive therewith, whereby said belt body can be opened by springing its opposite sides outwardly, and a chain laid in said chamber, said chain having laterally extending prong portions to penetrate the opposite sides of said belt body as they are brought together to enclose said chain, said chain and its prongs being wholly embedded within said belt body.

THEODOR F. E. FUCHSLOCHER.

REFERENCES CITED

The following references are of record in the file of this patent:

UNITED STATES PATENTS

| Number | Name | Date |
|---|---|---|
| 1,407,598 | Smith et al. | Feb. 21, 1922 |

FOREIGN PATENTS

| Number | Country | Date |
|---|---|---|
| 107,805 | Great Britain | July 11, 1917 |